United States Patent [19]

Milner

[11] Patent Number: 4,862,152
[45] Date of Patent: Aug. 29, 1989

[54] SONIC POSITIONING DEVICE

[76] Inventor: Ronald E. Milner, P.O. Box 1916, Grass Valley, Calif. 95945

[21] Appl. No.: 694,765

[22] Filed: Jan. 25, 1985

[51] Int. Cl.⁴ .............................................. G09G 3/02
[52] U.S. Cl. .................................. 340/712; 367/104; 367/117; 367/907; 178/18; 901/1
[58] Field of Search ............... 340/712, 709, 706, 710; 178/18; 367/117, 128, 103, 104, 907, 118; 901/1, 16

[56] References Cited

U.S. PATENT DOCUMENTS

| 3,504,334 | 3/1970 | Turnage | 178/18 |
| 3,792,243 | 2/1974 | Appel et al. | 340/710 |
| 3,838,212 | 9/1974 | Whetstone et al. | 178/18 |
| 4,317,005 | 2/1982 | de Bruyne | 367/117 |
| 4,506,354 | 3/1985 | Hansen | 367/907 |
| 4,524,348 | 6/1985 | Lefkowitz | 340/706 |
| 4,564,928 | 1/1986 | Glenn et al. | 178/18 |
| 4,654,648 | 3/1987 | Herrington et al. | 340/710 |

OTHER PUBLICATIONS

"Ultrasonic Cursor Position Detection", IBM Tech. Discl. Bulletin; vol. 27, No. 11, Apr. 85.

Primary Examiner—John W. Caldwell, Sr.
Assistant Examiner—Tyrone Queen
Attorney, Agent, or Firm—Michael L. Sherrard

[57] ABSTRACT

A three-dimensional ultrasonic position control device suitable for controlling computer displays or robot movements is disclosed.

More specifically, signals from an ultrasonic transmitter are received by multiple receivers. The received signals are processed by a processing circuit which provides signals to a computer system for use in controlling a computer display or a robot. This system is particularly adapted to use inexpensive components to provide for a low cost mass producible control device.

26 Claims, 11 Drawing Sheets

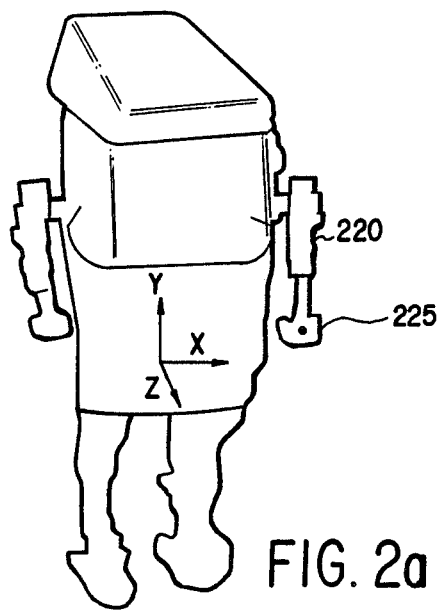
FIG. 2a
FIG. 2b
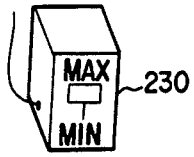
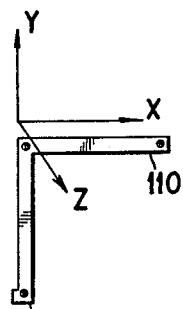
FIG. 2c

FRONT END CIRCUIT

SONIC POSITIONING DEVICE

BACKGROUND OF THE INVENTION

1. Field

The present invention relates generally to an position control device. More specifically, the present invention relates to a three-dimensional ultrasonic position control device suitable for controlling computer displays or robot movements.

2. Art Background

Graphical input devices for computers such as the mouse taught in USP 4,464,652 issued to William F. Lapson et al Aug. 7, 1984 are well known in the field of display systems, and more particularly in the field of controlling cursor positions on a computer display. However, mouse systems require a flat surface on which to operate the mouse and are inherently limited to two dimensions.

Ultrasonics have been used both in continuous wave (cw) applications and in pulse mode (pm) applications to detect positions. While cw techniques are able to measure distances quite accurately, they have problems with reflections due to multipath phenomena.

Both one-way and two-way pulse mode ultrasonic position detecting devices are known. Such systems have been used extensively in underwater applications such as for tracking torpedoes. U.S. Patent 3,205,475 issued to Rene N. Foss describes such a one-way system. A transmitter is positioned on a torpedo and its position relative to orthoganally positioned hydrophones is determined. This system is based on synchronizing clocks on the torpedo transmitter with clocks on the receiver so that transit times of the ultrasonic signal from the torpedo to the hydrophones can be determined without cabling. However, this system relies on accurate synchronized clocks, pre-launch synchronization and computation of the desired coordinate positions directly from the propagation times of the pulses from the torpedo to the hydrophones.

U.S. Patent 3,421,138 issued to Pierre Moulin et al describes another underwater positioning system for locating a floating installation or a submarine. For example, a ship's location is determined by transmitting an acoustical signal from the ship, receiving the acoustical signal at fixed locations on the ocean floor, and radioing back to the ship from floating buoys in response to the detections. In the preferred embodiment, this system makes certain approximations which take advantage of the fact that in this application the "z" distance, the depth of the water, remains relatively constant.

U.S. Patent 3,821,469 issued to Albert L. Whesone et al describes a graphical data device which provides digitized three dimensional positioning information by responding to the leading edge of the air propogated shock wave generated by a spark. However this technique requires two or three distributed strip-microphone receivers and is generally limited to determining positions of a stylus within a volume bounded by the distributed receivers.

Another graphics tablet is described in U.S. Patent 4,124,838 issued to Kiss. In the disclosed system a graphics tablet has an acoustically reflective movable element, two orthoganally positioned distributed strip-microphones along the axes, and a source of periodic sound waves at the origin.

A. E. Benner and P. de Bruyne describe a sonic pen system in an article titled A Sonic Pen: A Digital Stylus System, which appeared in the IEEE Transactions on Computers, June 1970. This system is used as a two or three dimensional computer graphical input device. However this system also uses a spark transmitter and distributed strip-microphones.

An article titled "The Lincoln Wand" by Roberts et al in the 1966 Fall Joint Computer Conference AFIPS Proceedings describes a three dimensional ultrasonic input system utilizing four transmitters fixed in a square and a hand-held pen containing a single receiver. The multiple transmitters are activated in sequence, allowing for sound echoes to die out between activations, which results in an inherently long cycle time, and a relatively slow response time.

A device for measuring three dimensional coordinates of models is taught in U.S. Patent 3,924,450 issued to Uchiyama et al. In this system a computer is used to calculate the position of an end of a pointer having two transmitters fixed on the pointer at known positions relative to the end. This system calculates the position of the end in response to the propagation time of a supersonic signal from each of the transmitters to each of three detectors positioned at known coordinates and positioned so as to have unobstructed propagation paths to each of the transmitters. In effect, this provides a five-dimensional input device. Further, this disclosure does not teach any particular techniques for efficiently solving the equations involved.

Also, USP 3,792,243 describes a Method for Encoding Positions of Mechanisms, USP 3,792,424 describes Apparatus for Detecting the Position of a Movable Article Under Water, USP 3,745,519 describes a Small Craft Positioning System and USP 3,383,651 describes a Plane Coordinate Computing System.

SUMMARY OF THE PREFERRED EMBODIMENT OF THE INVENTION

In the preferred embodiment of the present invention signals from an ultrasonic transmitter are received by multiple receivers. The received signals are processed by an processing circuit which provides signals to a computer system for use in controlling a computer display or a robot. This system is particularly adapted to use inexpensive components to provide for a low cost mass producible control device.

BRIEF DESCRIPTION OF THE DRAWINGS

FIGS. 2A, 2B and 2C are an illustration of the present invention used as a robot control system.

DETAILED DESCRIPTION OF THE PREFERRED EMBODIMENT OF THE PRESENT INVENTION

Figure 1:
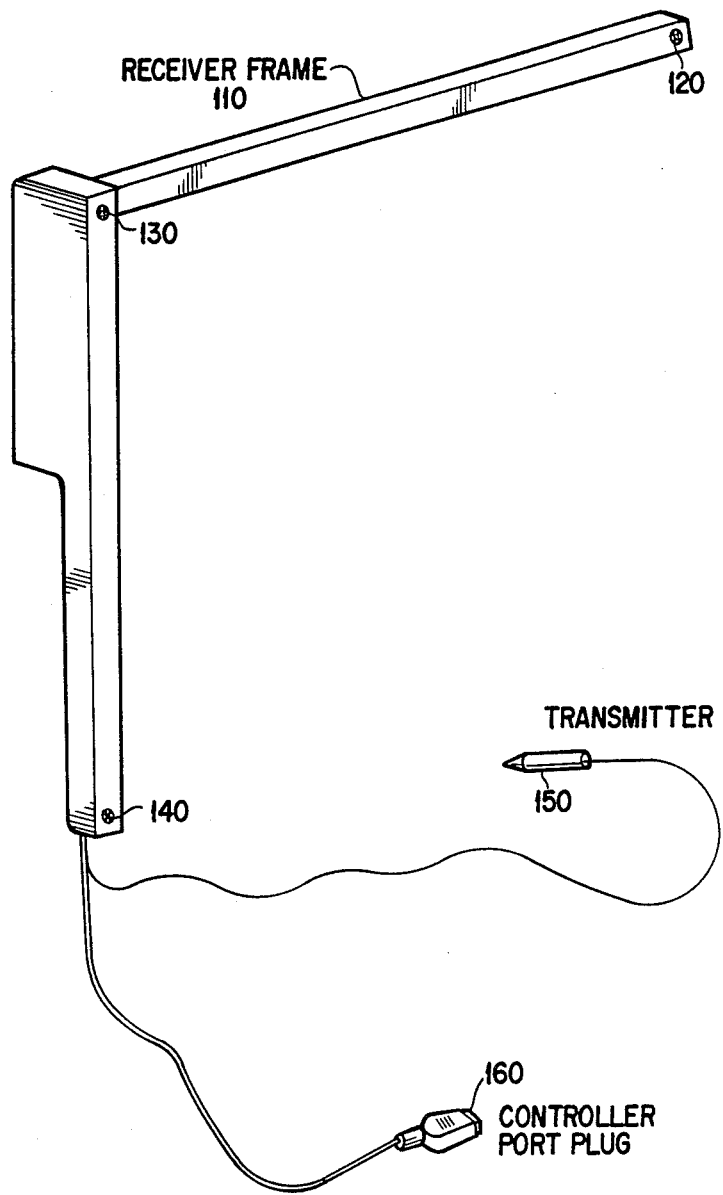
FIG. 1 is an illustration of one embodiment of the present invention.

FIG. 1 is an illustration of one embodiment of the present invention. A receiver frame 110 supports three ultrasonic receivers 120, 130 and 140. Receivers 120 and 130 define a first axis, which is orthoganal to the axis through receivers 130 and 140. The receiver frame 110 is coupled to a hand held ultrasonic transmitter 150 and to a controller port plug 160. Circuitry in the receiver frame responds to signals from the receivers, the transmitter, and the controller port plug and provides signals to the controller port plug indicative of the position of transmitter 150 relative to the receiver frame.

Receiver frame 110 is constructed in the shape of the letter "L" to fit securely onto the top and side of a rectangularly shaped video dispaly device such as a conventional monitor or television. I have built some frames that are hinged near receiver 130 so that the two arms can fold together for more conveinient packaging and storage.

Figure 2:
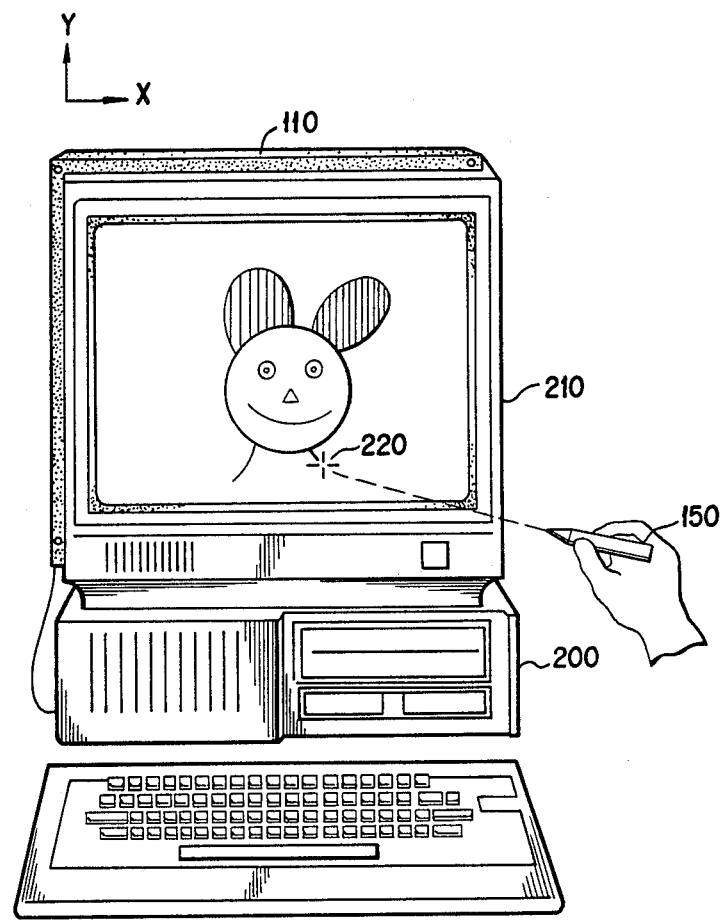
FIG. 2 is an illustration of the embodiment of FIG. 1 coupled to a computer having a display.

FIG. 2 is an illustration of the embodiment of FIG. 1 coupled to a computer 200 having a display 210. In this embodiment the receiver frame is adapted to fit on to the display 210 and has been placed on the display and aligned so that the plane of the receiver frame is substantially parallel to the plane of the video display. Alternatively it could be integrated into the cabinent of display 210. In this embodiment the computer is adapted such that the position of the transmitter is used to control the position of a cursor 220 on the display. More specifically, the receiver frame circuitry determines the position of the transmitter as projected onto the plane of the display. The computer, in response to position signals from the receiver frame and in accordance with internal instructions from a combination of its hardware, software and firmware responds by providing video display signals to display 210 such that moving the transmitter in an "X" direction moves cursor 220 in an "X" direction relative to the display and moving the transmitter in a "Y" direction moves the cursor in a "Y" direction relative to the display. Controller port 160 has been coupled to the computer I/O connector to receive request and timing signals from the computer and to provide the computer with position signals.

As illustrated in FIG. 2, the present invention can be used to move a cursor on a display. This movement can be used to draw graphics, to select options illustrated on the display, or to otherwise set variables for a computer program. In general, the present invention can be used to replace many existing controllers such as mice, graphics tablets and light pens. For example, the computer 200 could include a video display screen which is partitioned into areas corresponding to x and y coordinates projected into space and having a pointer or cursor image on the screen having a position on the screen responsive to the projected position of the transmitter. By moving the transmitter in space the pointer or cursor can be positioned in certain areas which correspond to different options or functions. Thus, by moving the transmitter different options can be selected, and with the addition of a switch to the transmitter, or by using the third dimension available with the present invention, a signal can be transmitted to the computer to activate the currently selected option. This signal can be transmitted either electrically along a wire, or transmitted electromagnetically.

In addition, the present invention provides for selective magnification of the transmitter movements and for generation of signals responsive to movement of the transmitter in a third dimension.

Alternatively, the present invention could be used to directly control a robot. For example, referring to FIG. 2A, movements of transmitter 150 directly control the movements of the hand 225 of a robot arm 220. Movement of the transmitter in an "X" direction relative to the receiver frame 110 causes robot hand 225 to move, by a combination of movements including rotation and extension of its arm, a corresponding amount in the "x" direction relative to the robots frame of reference. Similarly, movements of the transmitter in the "Y" and "Z" directions cause corresponding movement of robot hand 225 in the "y" and "z" directions. By watching the robot it is relatively simple to make the movements of the transmitter needed to effect the desired movements of the robot. Further, the gain, that is, the amplitude of the robot hand movement relative to the movement of the transmitter, is variable by means of magnification control. This permits either fast movements of the robot arm with relatively small transmitter movements of very accurate movements of the robot arm in response to correspondingly larger movements of the transmitter. In another embodiment the receiver frame 110 can be juxtaposed with the frame of reference of the robot.

FIG. 2B illustrates an auxiliary control that can be used to vary the magnification of the present invention. In the illustrated embodiment magnification control 230 is coupled to the computer. Selecting an increased magnification causes a correspondingly smaller movement of the robot hand.

Figure 3:
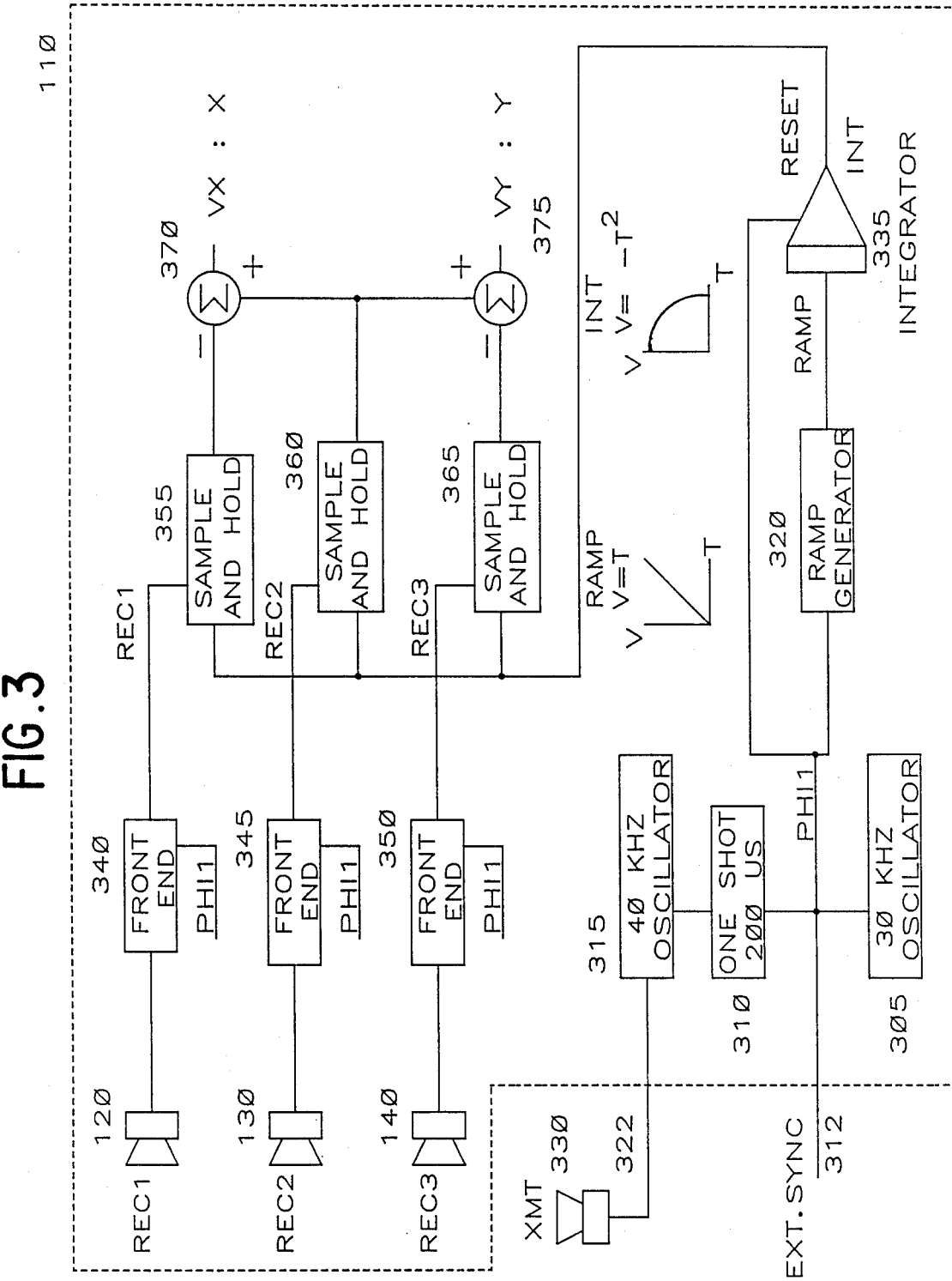
FIG. 3 is a block diagram of one embodiment of the processing circuitry.

FIG. 3 is a block diagram of one embodiment of the processing circuitry. In the preferred embodiment this circuitry is located within receiver frame 110. Oscillator 305 provides an electrical signal 01 having a frequency in the range of 30 to 60 hz. Oscillator 305 is coupled to a one shot 310 which provides pulses having durations of approximately 200 usec in response to the leading edges of the 01 signals. Provision is also also made for external synchronization of oscillator 305 in response to a signal on input 312.

The 200 usec pulses from one shot 310 are coupled to enable oscillator 315 which produces signals in the ultrasonic range, preferably in the range of 26–200 khz. I have found a 40 khz. oscillator to be satisfactory. The 01 signal is also coupled to reset a ramp generator 320 and other portions of the circuitry.

An ultrasonic transmitter 330 is coupled to receiver frame 110 by a wire 322 which couples the ultrasonic signal from oscillator 315 to the transmitter. Alternatively, the transmitter could be battery powered and generate the ultrasonic signal internally, synchronizing with the 01 signal which could be transmitted by an electromagnetic signal such as an infrared or radio signal from the receiver frame to the transmitter. In yet another alternative the 01 signal could be generated in the transmitter and a synchronizing signal transmitted to the receiver frame.

Thus, in the present embodiment the 01 signal and the ultrasonic bursts generated by the transmitter in response thereto are periodic. Alternatively the transmitter and receiver circuitry responds to an externally generated signal applied to input 312, which can be a position request signal from a computer. These position request signals can be aperiodic or synchronized to the computer or its associated display. Such a position request signal is typically generated by the computer once for each display frame (about 30 to 60 times per second).

Preferably the transmitter is a Panasonic piezo device, part number EFROSB40K2 ultrasonic transducer. This device, and the related receivers, are high-Q devices which have a relatively long rise times in comparison to the period of the ultrasonic signals. Accordingly, a pulse width is chosen which is long enough to permit a multiple cycle burst of ultrasonic waves to be generated in response to each 01 signal such that the transmitter and receivers reach nominal amplitudes.

Ramp generator 320 produces an electrical signal RAMP characterized by a voltage which increases linearly with the time from 01. The RAMP signal is coupled to an integrator 335 which is also coupled to be reset by the 01 signal. Integrator 335 provides an output INT which is the integral of the received RAMP signal from the time of the last 01 signal. Since the integral of a ramp function is a square function, the INT signal is also proportional to the square of the time from the 01 signal.

The ultrasonic signal transmitted from transmitter 330 is received by three ultrasonic transducers 120, 130 and 140. Preferably these transducers are piezo devices of the type sold by Panasonic under the part number EFRRSB40K2 ultrasonic receiver.

In the preferred embodiment transducers 120, 130 and 140 are positioned such that a first axis through the first and second transducers intersects a second axis through the second and third transducers at a right angle. Preferably the three transducers are spaced apart approximately 12-20 inches. Each transducer is coupled to a front end circuit which serves to detect the ultrasonic bursts. Specifically, transducer 120 is coupled to a front end circuit 340, transducer 130 is coupled to a front end circuit 345, and transducer 140 is coupled to a front end circuit 350. These front end circuits are identical and are illustrated in block diagram FIG. 4.

Figure 4:
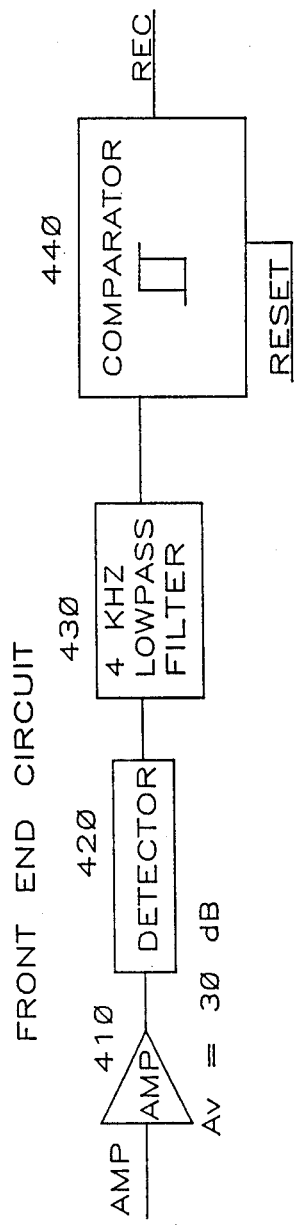
FIG. 4 is a block diagram of the front end circuit of FIG. 3.

Referring to FIG. 4, the analog output of a transducer is applied to a 50 db amplifier 410. I have found that a standard audio amplifier as shown in the 1967 GE Transistor Manual is satisfactory to amplify the ultrasonic transducer output. A detector 420 receives the amplified transducer signal and follows the envelope of the 40 khz signal, converting this envelope into a dc voltage. In the preferred embodiment of the present invention detector 420 is simply a rectifier followed by a RC circuit, which passes only the smoothed positive portion of the signal to produce a dc component which is filtered by the following circuitry.

A low pass filter 430 comprises a second order filter having a 3 db point at 4 khz. This filter smooths the envelope from detector 420 and serves to interpolate between successive cycles of the 40 khz waveform. A comparator 440 is coupled to receive the filtered envelope signal and latches on receipt of the amplitude of the filtered envelope signal exceeding a threshold voltage. In the preferred embodiment this threshold is a function of time from the 01 signal and is approximately proportional to the inverse square of the time from the 01 signal. Since the ultrasonic signal is transmitted in response to the 01 signal and the ultrasonic signal amplitude in space decreases as the inverse sqaure of distance (and propagation time) this variation in threshold serves to reduce the sensitivity of the receivers to noise. Thus the sensitivity of the receivers increase with time until a signal is received, to accomodate the weaker signal expected from a more distant transmitter.

Each front end circuit provides a digital REC signal in response to detection of the ultrasonic signal by the comparator. Each of the front end circuits is coupled to a corresponding sample and hold circuit which samples in response to receipt of the REC signal. Front end circuit 340 is coupled to sample and hold circuit 355, front end circuit 345 is coupled to sample and hold circuit 360, and front end circuit 350 is coupled to sample and hold circuit 365. Each sample and hold circuit is also coupled to sample the INT signal from integrator 335 in response to receipt of the REC signal. Thus, sample and hold circuit 355 will sample and hold the voltage of the INT signal at the instant of receipt of the ultrasonic pulse by receiver 120. The amplitude of the sampled INT signal will be proportional to the square of the time from the 01 signal to the detection of the ultrasonic signal by front end circuit 340. Similarly, sample and hold circuits 360 and 365 will sample and hold the INT signal in response to the detection of the ultrasonic signal by front end circuits 345 and 350 respectively.

The signals sampled and held by sample and hold circuits 355 and 360 are coupled to a subtractor circuit 370 which produces a signal $V_x$. The amplitude of $V_x$ is proportional to the position of the transmitter relative to the axis through receivers 120 and 130 as projected onto the plane of the receivers as can be demonstrated by the following relationships.

Receivers 120, 130, and 140 are disposed in a plane and the position of transmitter 150 is defined by its position x, y and z with respect to the coordinate system having:

Receiver 130 at $(-1,-1,0)$ (One unit negative along the x and y axes)
Receiver 120 at $(1,-1,0)$ (One unit along the x axis, and negative one unit on the y axis)
Receiver 140 at $(-1,1,0)$ (One unit along the y axis, negative one unit along the x axis)

In this coordinate system the distance $d_1$ between the transmitter (at x,y,z) and receiver 130 (at $-1,-1,0$) becomes:

$$d_1 = SQRT[(x+1)^2 + (y+1)^2 + z^2] \qquad (EQ\ 1)$$

Similarly, the distance $d_2$ between the transmitter and receiver 120 (at $1,-1,0$) becomes:

$$d_2 = SQRT[(x-1)^2 + (y+1)^2 + z^2] \qquad (EQ\ 2)$$

And, the distance $d_3$ between the transmitter and reciever 140 (at $-1,1,0$) becomes:

$$d_3 = SQRT[(x+1)^2 + (y-1)^2 + z^2] \qquad (EQ\ 3)$$

Solving for x and y yields:

$$x = (d_1^2 - d_2^2)/4 \qquad (EQ\ 4)$$

$$y = (d_1^2 - d_3^2)/4 \qquad (EQ\ 5)$$

Equations 4 and 5 give the x and y coordinates of the transmitter in terms of the differences of the squares of the distances $d_1$, $d_2$, and $d_3$. Since the distances from the transmitter to the respective receivers are proportional to the propogation times of the ultrasonic pulse to the respective receivers the x and y coordinates of the transmitter becomes a function of the difference in the squares of the propogation times.

Thus, the $V_x$ signal provided by subtractor 370 is proportional to the x coordinate of the transmitter. Similarly, the output signal $V_y$ from the subtractor 375 is proportional to the y coordinate of the transmitter.

Figure 5:
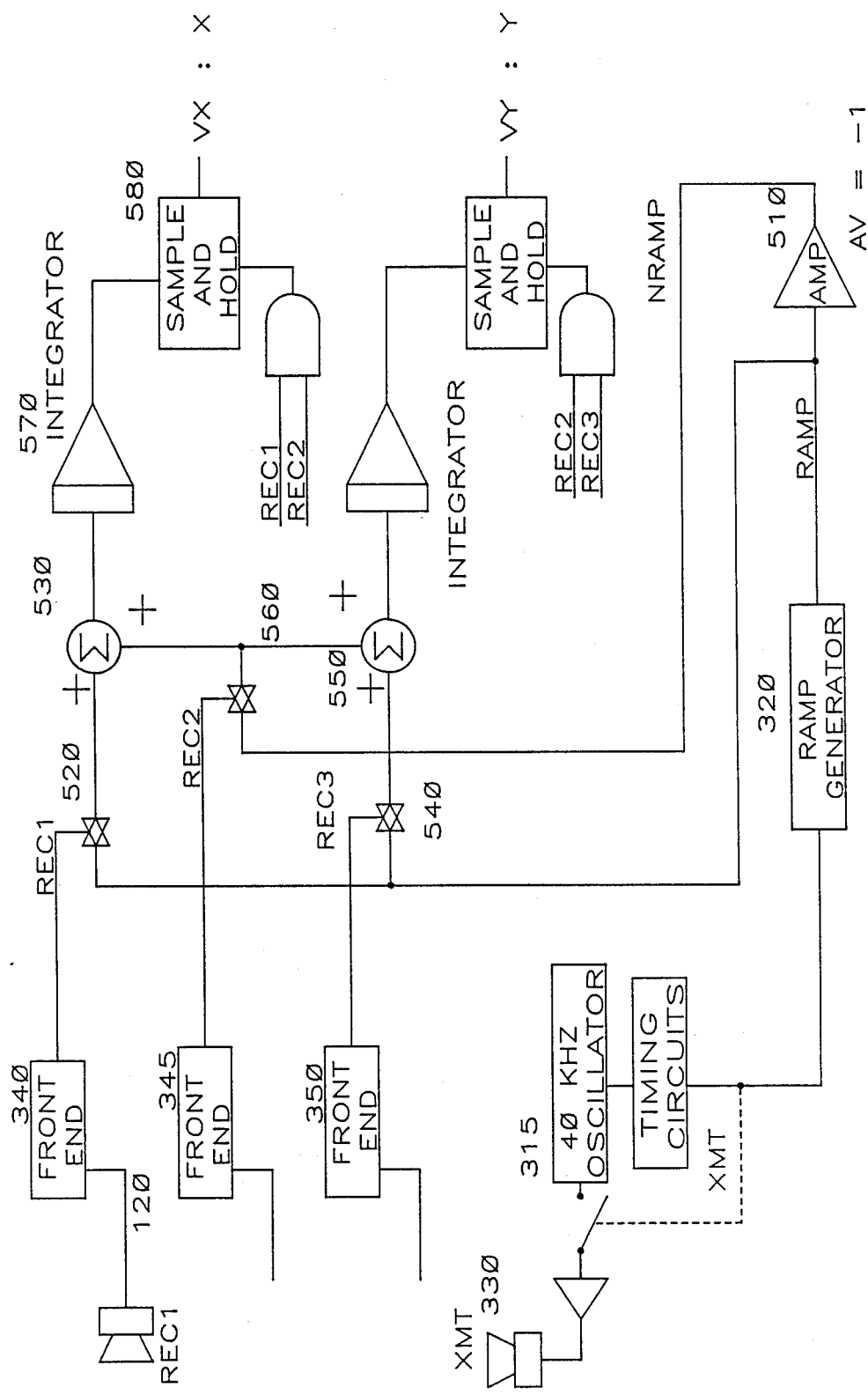
FIG. 5 is a block diagram of a second embodiment of the receiver frame circuitry of the present invention.

FIG. 5 is a block diagram of a second embodiment of the receiver frame circuitry of the present invention. In this embodiment separate integrators are provided for each channel. Ramp generator 320 is coupled to an inverting amplifier 510 which provides a negative going ramp signal NRAMP having a slope of the same absolute magnitude as RAMP. The RAMP signal is switchably coupled through CMOS switch 520 to adder 530 in response to the REC1 signal from front end circuit 340. Similarly, the RAMP signal is switchably coupled through CMOS switch 540 to adder 550 in response to the REC3 signal from front end circuit 350. Finally, the negative ramp signal NRAMP is coupled through CMOS switch 560 to adders 530 and 550 in response to the REC2 signal from front end circuit 345.

Adder 530 adds the applied ramp signals and applies the sum signal to the input of integrator 570. Thus a positive "x" position of the transmitter will be characterized by the REC1 signal arriving before the REC2 signal. Similarly, a negative "x" will be characterized by the REC2 signal arriving before the REC1 signal. Since the RAMP and NRAMP signals have equal slopes and start at the same time, once both REC1 and REC2 signals have been generated and applied to adder 530 the RAMP and NRAMP signals will cancel one another and the output of adder 530 will be zero. The integral of the sum signal from adder 530 can be shown to be proportional to the square of the differences between the transmissions times which is proportional to the desired "x" position.

A sample and hold circuit 580 samples the integrator output on the receipt of the second of the two signals REC1 and REC2 and provides a sampled analog signal proportional to the x position. The adder 550 operates in a similar manner with respect to the "y" position.

Figure 6:
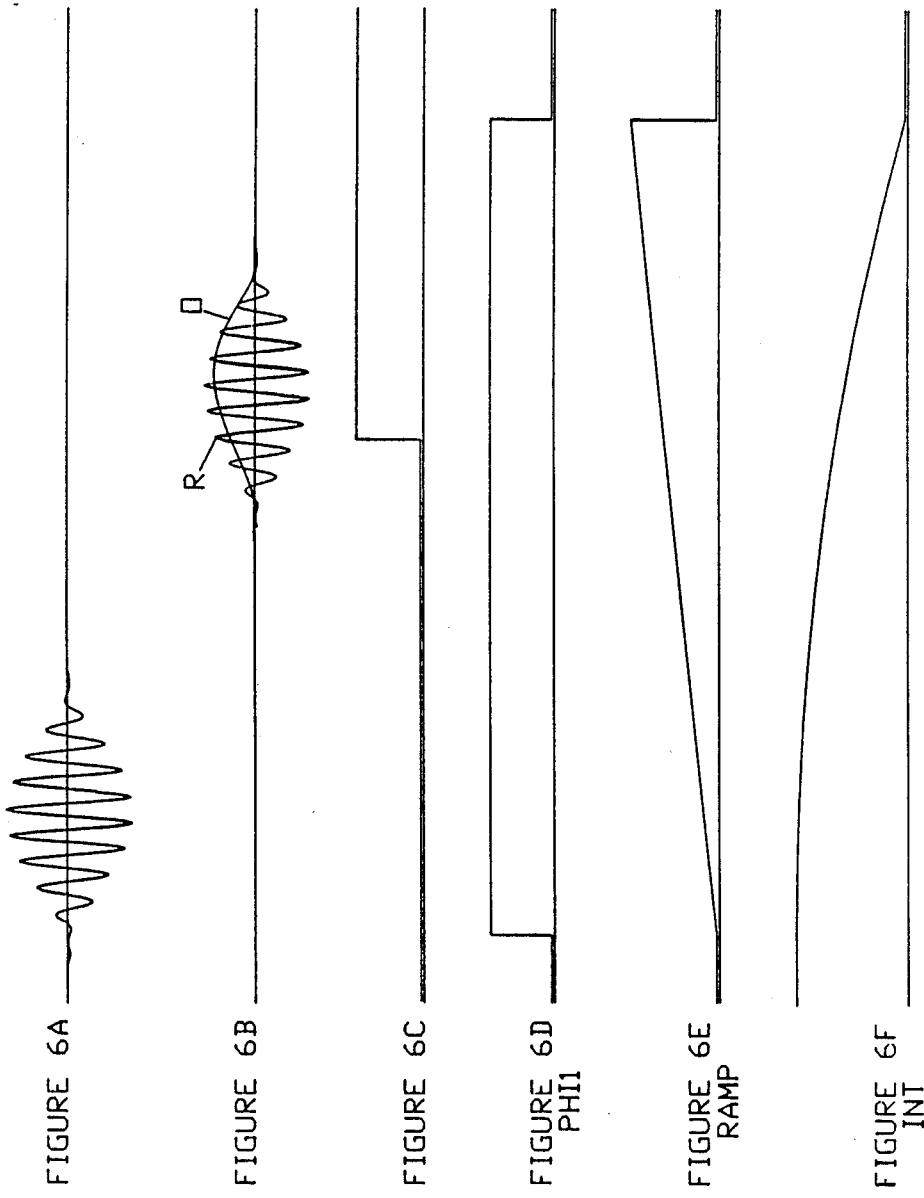
FIGS. 6A, 6B, 6C, 6D, 6E and 6F are an illustration of the waveforms of the signals which characterize FIGS. 3 and 4.

FIG. 6 is an illustration of the waveforms of the signals which characterize FIGS. 3 and 4. Specifically, waveform 6a illustrates a 40 khz ultrasonic burst. As shown, the ultrasonic burst is characterized by a significant rise and fall time and a multiple number of cycles. Waveform 6b illustrates the output 0 of lowpass filter 430 and the received waveform R. Waveform 6c illustrates the output of comparator 440. Waveforms 6d, 6e, 6f illustrate the timed relationship between the 01 signal 6d, the RAMP signal 6e and the INT signal 6f.

Figure 7:
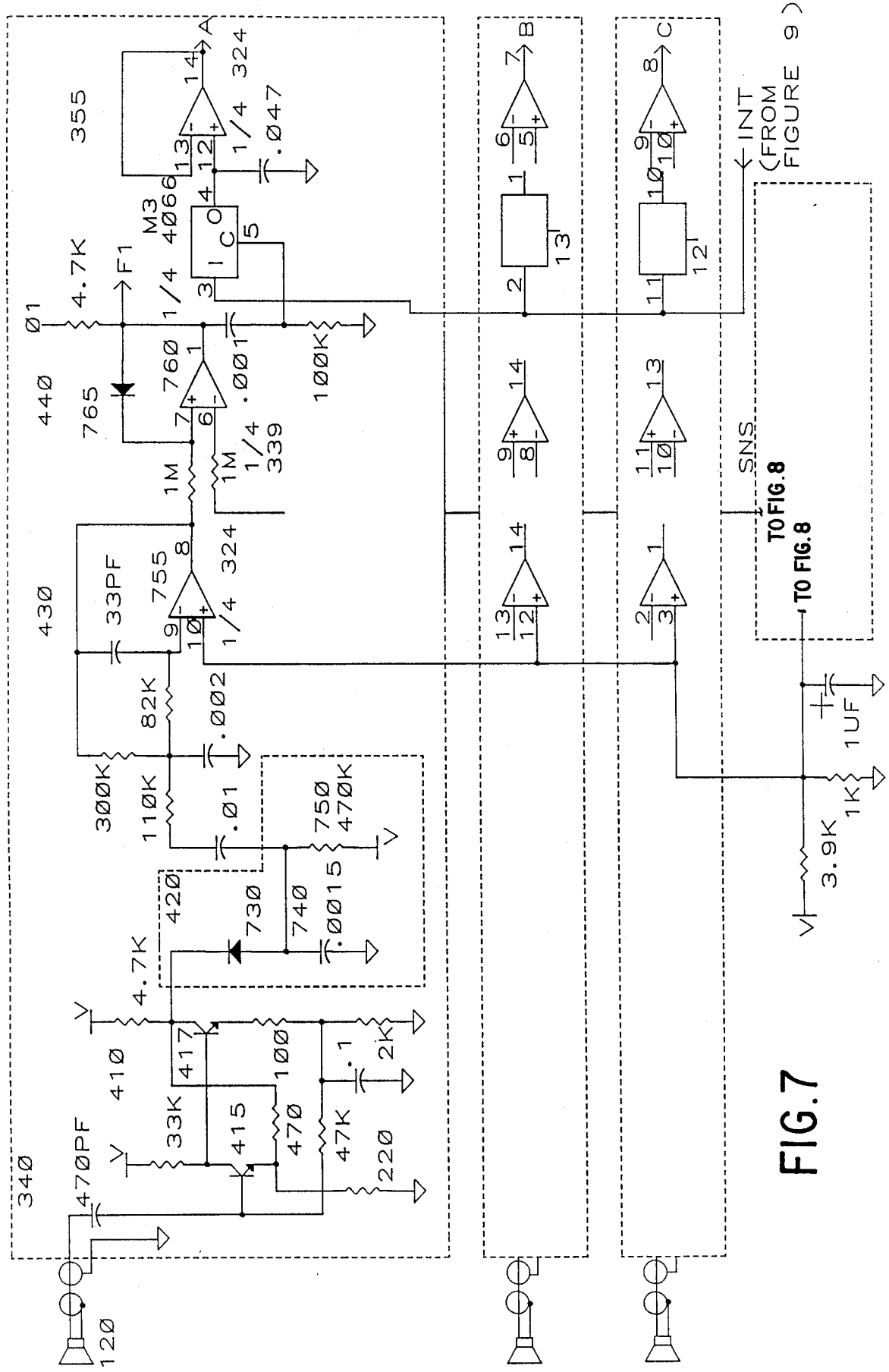
FIG. 7 is a detailed schematic diagram of an ultrasonic receiver, front end circuit and sample and hold circuit as in FIGS. 3 and 4.

FIG. 7 is a detailed schematic diagram of an ultrasonic receiver, front end circuit and sample and hold circuit as in FIGS. 3 and 4. Specifically, receiveer 120 receives the ultrasonic burst and is coupled to front end circuit 340. Front end circuit 340 provides a signal F1 in response to detecting the ultrasonic burst which causes sample and hold circuit 355 to sample the signal INT.

More particularly, front end circuit 340 includes an amplifier circuit 410 coupled to receive the ultrasonic burst from receiver 120. Amplifier circuit 410 includes transistors 415 and 417 and provides an amplified ultrasonic signal to detector 420. Detector 420 comprises a diode 730, a capacitor 740 and a resistor 750, and provides a partially filtered and rectified output to low pass filter 430. Low pass filter 430 includes an operational amplifier 755 and filters and smooths the signal. The filtered output from low pass filter 430 is applied to one input of comparator 440 which provides an output signal F1 in response to the filtered output signal having a voltage greater than the voltage on the SNS input. Comparator 440 includes diode 765 which causes the output of comparator circuit 760 to latch in a high state once triggered by the output of low pass filter 430. The latch is reset at the end of the cycle when the 01 signal goes low.

Sample and hold circuit 355 samples the INT signal in response to the F1 signal and provides a buffered output signal having an amplitude responsive to the amplitude of the sampled INT signal.

Figure 8:
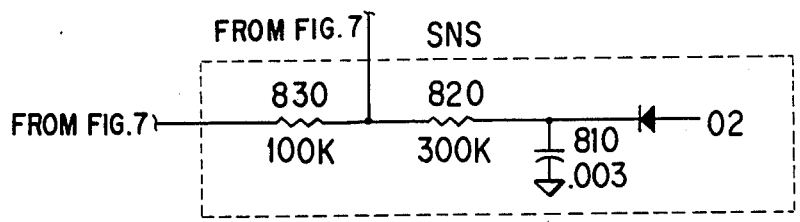
FIG. 8 is a detailed schematic of the circuit used to generate the SNS signal.

FIG. 8 is a detailed schematic of the circuit used to generate the SNS signal applied to the second input of comparator 440 of FIG. 7. A 02 signal, which is the inverse of the 01 signal, charges capacitor 810, setting a high threshold for detection of a signal by comparator 440. During the 01 signal capacitor 810 discharges through resistors 820 and 830 with time such that the voltage of the SNS signal is reduced as a function of time. Thus, the sensitivity of the comparator 440 increases with time from the start of the 01 signal. The RC decay is chosen to approximate the square-law reduction in signal strength associated with the distances and propagation times of the transmitter. Thus the circuitry is less sensitive to noise when the propagation times are short yet still sensitive enough to detect the ultrasonic burst when the transmitter is at a considerable distance from the receiver.

Figure 9:
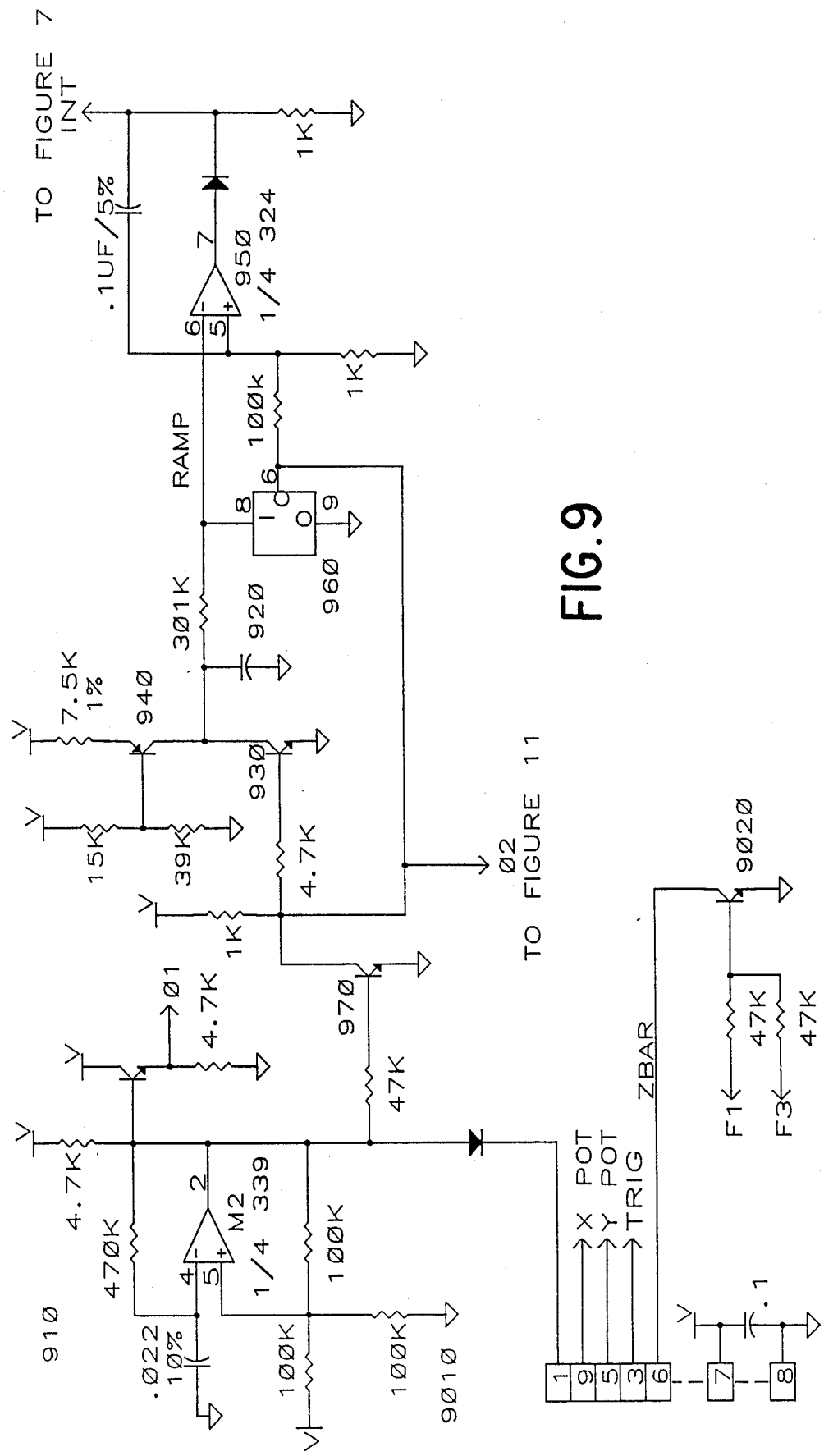
FIG. 9 is a detailed schematic of circuitry used to connect the present invention to a computer and to generate the INT signal.

FIG. 9 is a detailed schematic of circuitry used to connect the present invention to a computer and to generate the INT signal sampled by the circuitry of FIG. 7. A clock circuit 910 provides 01 and 02 timing signals for the control of the the initiation of the RAMP signal, the transmission of the ultrasonic signal, and the discharge and reset of the integrator and sample and hold circuits.

In one embodiment of the present invention this oscillator is synchronized to a computer. More specifically, referring to FIG. 10, a link circuit is provided for a computer that permits the clock circuit 910 to be synchronized to the computer. Specifically, when the computer reads its "pot" ports it discharges the pot lines in the process. When the XPOT line, which is coupled to the x pot port, is discharged, comparator 1010 discharges forces the 01 line to a low logic state and resets oscillator 910.

Synchronizing the 01 cycle with the reading of the pot lines is advantageous since by reading the outputs of the processing circuitry at a constant time relative to the transmit times the errors due to drift in the sample and hold circuits are minimized resulting in a steadier output signal.

Transistor 970 generates a 02 signal in response to the 01 signal from clock circuit 910. During the 02 signal capacitor 920 is discharged through transistor 930. During the 01 signal transistor 940 acts as a current source and charges capacitor 920, generating the RAMP signal. Similarly, integrator 950 is reset by the 02 signal which connects the negative input of integrator 950 to ground through switch 960 which saturates integrator 950 and resets it to a high output. In operation integrator 950 will generate the negative integral of the RAMP signal.

Figure 11:
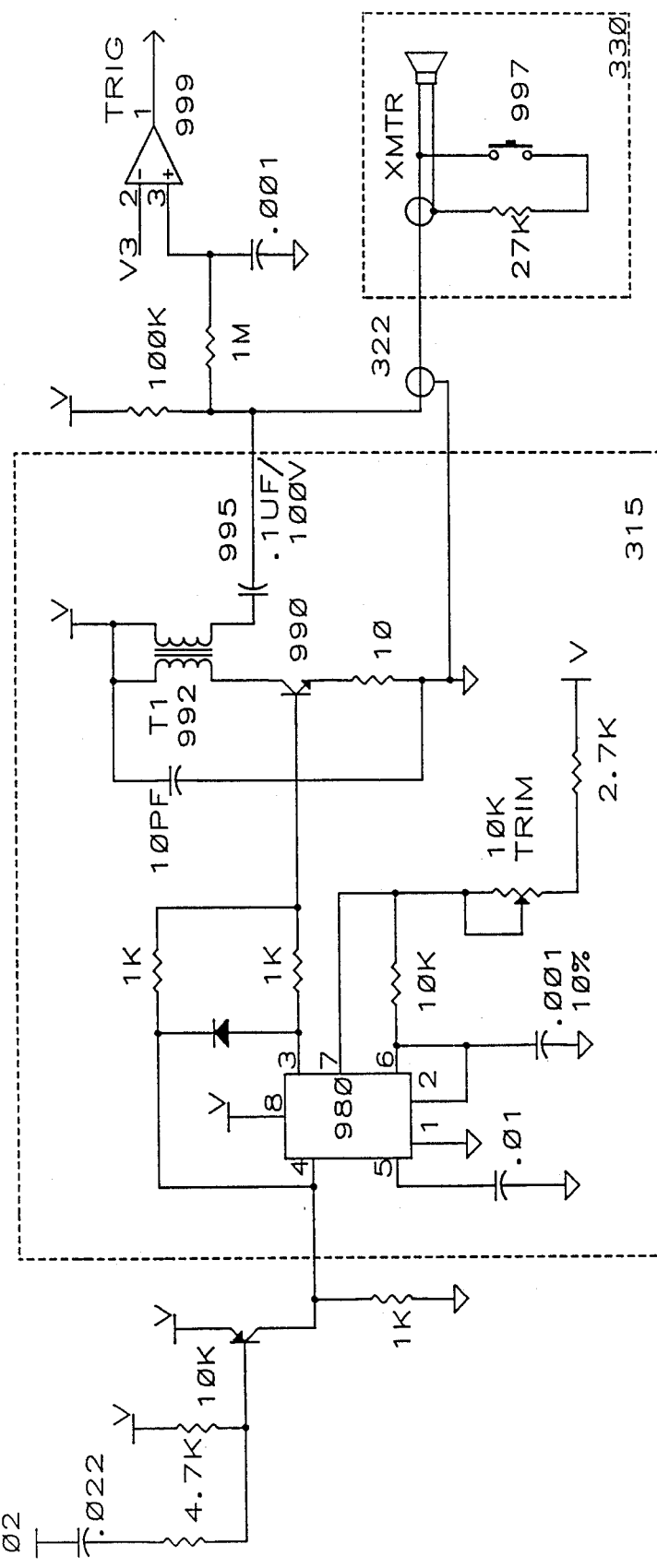
FIG. 11 is a detailed schematic diagram of the one shot, oscillator and transmitter of FIG. 3.

FIG. 11 is a detailed schematic diagram of the one shot, oscillator and transmitter of FIG. 3. One shot 310 enables oscillator 315 which generates a 40 khz signal. Oscillator 315 includes astable multivibrator 980 which is coupled to driver transistor 990. The output of driver transistor 990 is increased in voltage by flyback transformer 992 and is AC coupled by capacitor 995 to ultrasonic transmitter 330.

Transmitter 330 is normally biased to 5 v dc. However, closure of a switch 997 on the transmitter causes line 322 to go low, which is detected by circuit 999 which generates a trigger signal TRIG which is coupled to the computer interface 9010 illustrated in FIG. 9.

In operation line 322 carries a 50 vac 40 khz signal during transmit and also carries the dc switch signal. In the preferred embodiment coaxial cable is used for this line.

Referring to FIG. 9, an approximation of the z distance is derived from either the F1 of F3 signal, whichever occurs first. The F1 and F3 signals are coupled to transistor 9020 such that the first occurring of these signals generates a ZBAR signal, applied to the computer interface 9010. The time of this signal relative to 01 provides an approximate measure of the z position of the transmitter. Alternatively, z can be obtained exactly either by use of a more complex algorithm or circuitry or by using a single additional sensor in the z dimension. However, I have found that these alternatives are slow, complex and involve more expense than the preferred embodiment.

Figure 10:
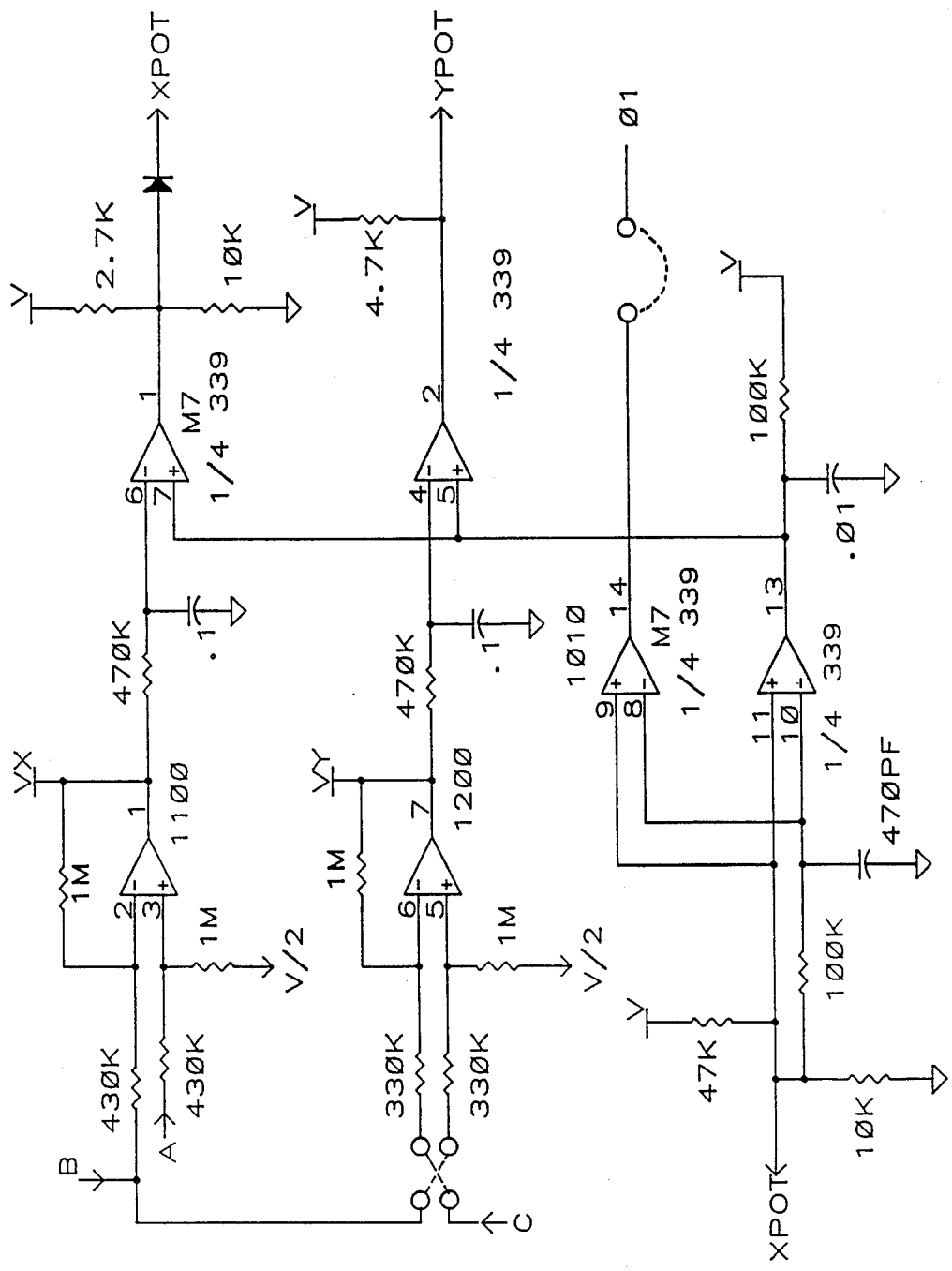
FIG. 10 is a detailed schematic of a circuit to permit the clock circuit to be synchronized to the computer.

Referring to FIG. 10, adder circuit 1100 provides a difference signal in response to the INT signals sampled by front end circuits 340 and 345. Similarly, circuit 1200 provides a difference signal in response to the INT signals sampled by front end circuits 345 and 350. These difference signals are then buffered and processed for application to the interface connection 9010 of FIG. 9 and presented to the computer as x and y potentiometer inputs.

As can be appreciated from the above descriptions the present invention is sensitive only to the first signals from the transmitter since it immediately latches in response to the detection of the ultrasonic burst. I have determined that echos have substantially died in 16 to 33 msec, thus I have used that time as my preferred repetition rate. The combination of this repetition rate and the variable threshold circuitry combines to make the present circuitry quite insensitive to noise.

While the invention has been particularly taught and described with reference to the preferred embodiments, those versed in the art will appreciate that minor modifications in form and details may be made without departing from the spirit and scope of the invention. For instance, in the embodiment illustrated in FIG. 5 it would be equivalent to generate only a positive ramp signal and to replace the adders with a subtractor circuit. Accordingly, all such modifications are embodied within the scope of this patent as properly come within my contribution to the art and are particularly pointed out by the following claims.

I claim:

1. A system for indicating the position of a hand movable ultrasonic transmitter with respect to an array of detectors comprising:
    an ultrasonic transducer for transmitting a burst of ultrasonic waves;
    an array of detectors responsive to the burst including three point detectors positioned such that a first axis through the first and second detectors intersects a second axis through the second and third detectors;
    means responsive to the detection of the burst by the first and second detectors for indicating the position of the transmitter relative to the first axis and responsive to the detection of the burst by the second and third detectors for indicating the position of the transmitter relative to the second axis and responsive to the detection of the burst by only one of the detectors for indicating the position of the transmitter relative to a third axis orthogonal to the plane defined by the three detectors.

2. A system as in claim 1 wherein the one detector is the detector which first receives the burst.

3. Apparatus for controlling the position of a cursor on a display screen comprising:
    means for generating a first signal;
    a hand movable ultrasonic transducer for transmitting a burst of ultrasonic waves in timed relationship to the first signal;
    an array of detectors responsive to the burst including three point detectors positioned such that a first axis through the first and second detectors intersects a second axis through the second and third detectors at substantially a right angle;
    means for providing a second signal proportional to the square of the period of time from the generation of first signal;
    means for sampling the second signal in response to the detection of the burst by each of the detectors;
    first means responsive to the signal sampled in response to the detection of the burst by the first and second detectors for indicating the position of the transmitter relative to the first axis;
    second means responsive to the signal sampled in response to the detection of the burst by the second and third detectors for indicating the position of the transmitter relative to the second axis; and
    display means for positioning a cursor on a display screen relative to one axis of the display screen in response to the position of the transmitter relative to the first axis and for positioning the cursor on the display screen relative to another axis of the display screen in response to the position of the transmitter relative to the second axis.

4. Apparatus as in claim 3 wherein the second signal is an analog voltage.

5. Apparatus as in claim 3 wherein the second signal is a binary value in a digital counter.

6. Apparatus as in claim 3 wherein the second signal is represented by a binary value stored in a memory location of a general purpose microprocessor.

7. Apparatus as in claim 3 wherein the hand movable ultrasonic transducer also transmits the first signal electromagnetically to the means for providing the second signal.

8. Apparatus as in claim 3 further comprising means for generating the first signal and for transmitting an electromagnetic signal to the ultrasonic transducer in timed relationship to the first signal, wherein the ultrasonic transducer transmits the burst in response to the electromagnetic signal.

9. Apparatus for controlling the position of a cursor on a display screen comprising:
    means for generating a first signal;

a hand removable ultrasonic transducer for transmitting a burst of ultrasonic waves in timed relationship to the first signal;

an array of detectors responsive to the burst including three point detectors positioned such that a first axis through the first and second detectors intersects a second axis through the second and third detectors at substantially a right angle;

means for providing a ramp signal proportional to the period of time from the generation of the first signal;

means for integrating the ramp signal from a first detection of the burst by one detector until a subsequent detection by another detector on the same axis and for providing an integral in response to the detections by the first and second detectors and another integral in response to the detections by the second and third detectors;

first means responsive to the integral provided in response to the detections by the first and second detectors for indicating the position of the transducer relative to the first axis;

second means responsive to the integral provided in response to the detections by the second and third detectors for indicating the position of the transducer relative to the second axis; and display means for positioning a cursor on a display screen relative to one axis of the display screen in response to the position of the transmitter relative to the first axis and for positioning the cursor on the display screen relative to another axis of the display screen in response to the position of the transmitter relative to the second axis.

10. Apparatus as in claim 9 wherein the ramp signal is latched to an integrator in response to the detection of the burst by one detector and further comprising:

means for inverting the ramp signal; and means for latching the inverted signal to the input of the integrator in response to detection of the burst by the other detector on the same axis as the one detector.

11. Apparatus as in claim 9 wherein the hand movable ultrasonic transducer also transmits the first signal electromagnetically to the means for providing the ramp signal.

12. Apparatus as in claim 9 further comprising means for transmitting an electromagnetic signal to the ultrasonic transducer in timed relationship to the first signal, wherein the ultrasonic transducer transmits the burst in response to the electromagnetic signal.

13. A method of determining the position of an ultrasonic transmitter with respect to an axis having two point receivers positioned thereon comprising the following steps:

transmitting a burst of ultrasonic waves from the transmitter;

generating a representation proportional to the square of the period of time from the transmission;

detecting the receipt of the burst at each of the receivers;

sampling the representation at the time of each detection; and generating a value indicative of the position in response to the difference between the sampled representations.

14. A method as in claim 13 for further determining the position of the ultrasonic transmitter with respect to another axis through one of the two receivers and a third receiver comprising the additional steps of:

detecting the receipt of the burst at the third receiver;

sampling the representation at the time of detection by the third receiver; and generating a value indicative of the position with respect to the other axis in response to the difference between the representations sampled in response to the detections by the the one and the third receivers.

15. A method as in claim 14 wherein the step of generating a representation proportional to the square of the period of time from transmission comprises the steps of:

generating an intermediate representation proportional to the period of time from transmission; and integrating the intermediate representation.

16. A method as in claim 15 wherein the intermediate representation is an analog signal and the step of integrating is performed by an analog integration circuit.

17. A method as in claim 15 wherein the intermediate representation is a binary number stored in a register and the step of integrating is performed by an accumulator circuit.

18. A method as in claim 15 wherein the intermediate representation is a time value in a general purpose microprocessor and the step of integrating is performed by periodically adding the time value to a memory location.

19. A method of determining the position of an ultrasonic transmitter with respect to an axis having first and second point receivers positioned thereon comprising the following steps:

transmitting a number of cycles of an ultrasonic wave from a transmitter;

detecting the receipt of the burst at each of the receivers;

generating a positive representation proportional to the period of time from transmission to detection by the first receiver;

generating a negative representation proportional to the period of time from transmission to the detection by the second receiver;

integrating the sum of the representations; and sampling the integrated sum after detection of the burst by both detectors.

20. A method as in claim 19 wherein the positive and negative representations are analog signals and the step of integrating is performed by an analog integration circuit.

21. A method as in claim 19 wherein the positive and negative representations are binary numbers stored in a register and the step of integrating is performed by an accumulator circuit.

22. A method as in claim 19 wherein the intermediate representation is a time value in a general purpose microprocessor and the step of integrating is performed by periodically adding the time value to a memory location.

23. Apparatus as in claim 3 further comprising;

a switch located on the hand movable ultrasonic transducer for generating a switch signal;

wires coupled between the transducer and the first and second means for providing ac drive to the transducer;

means for transmitting the switch signal as a dc level shift on the wires; and means for detecting the switch signal on the wires for providing a selection signal.

24. Apparatus as in claim 9 further comprising;
a switch located on the hand movable ultrasonic transducer for generating a switch signal;
wires coupled between the transducer and the first and second means for providing ac drive to the transducer;
means for transmitting the switch signal as a dc level shift on the wires; and
means for detecting the switch signal on the wires for providing a selection signal.

25. A system for programming movements of a robot in a first coordinate system in response to movements of a hand movable ultrasonic transmitter in a second coordinate system defined by an array of detectors comprising:
an ultrasonic transducer for transmitting a burst of ultrasonic waves;
an array of detectors responsive to the burst including three point detectors positioned such that a first axis through the first and second detectors intersects a second axis through the second and third detectors;
means responsive to the detection of the burst by the first and second detectors for indicating the position of the transmitter relative to the first axis and responsive to the detection of the burst by the second and third detectors for indicating the position of the transmitter relative to the second axis and responsive to one of the detectors for indicating the distance between the transmitter and one or more detectors which provides the position of the transmitter relative to a third axis orthogonal to the plane defined by the three detectors;
means for controlling the movements of a robot such that movements of the transmitter along the first, second and third axes of the second coordinate system result in movements of the robot in corresponding axes of the first coordinate system.

26. Apparatus as in claim 25 further comprising means coupled to the ultrasonic transducer for synchronizing the transmitting of the burst of ultrasonic waves with a request signal from a computer.

* * * * *